Feb. 28, 1956  A. MANHARTSBERGER  2,736,462
INFLATING DEVICE
Filed July 18, 1952  2 Sheets-Sheet 1
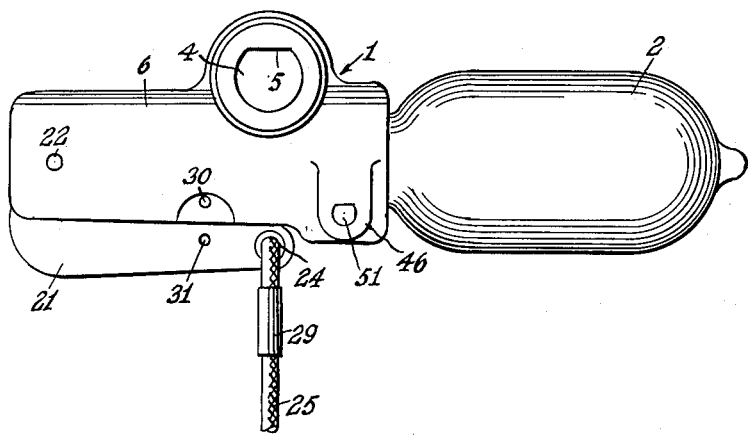
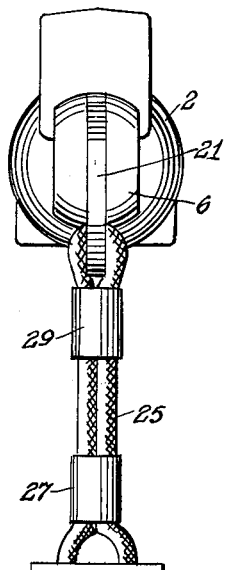
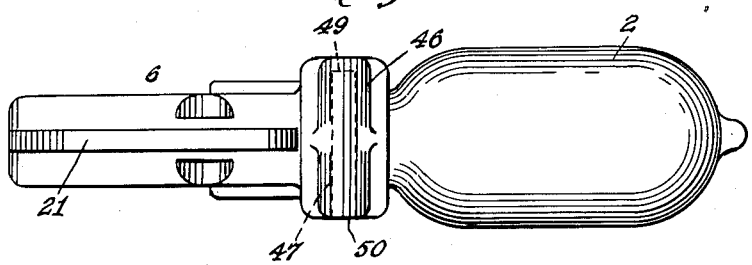
INVENTOR.
ALBERT MANHARTSBERGER
BY Edward P. Connors
ATTORNEY Feb. 28, 1956
A. MANHARTSBERGER
2,736,462
INFLATING DEVICE
Filed July 18, 1952
2 Sheets-Sheet 2
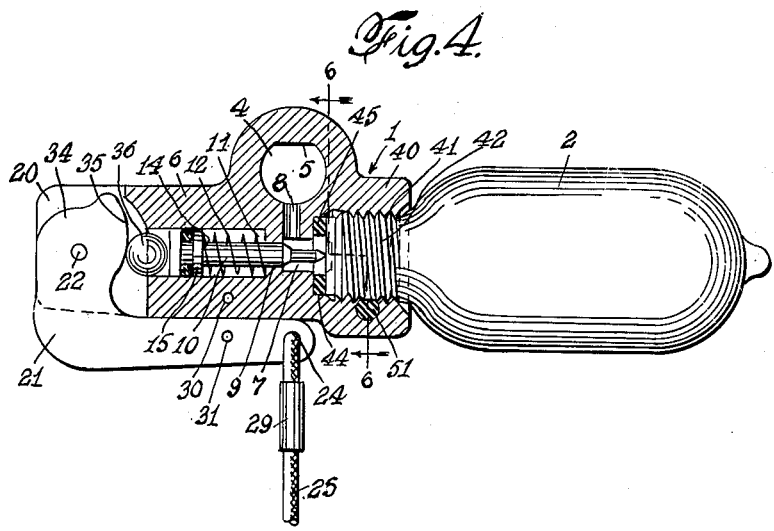
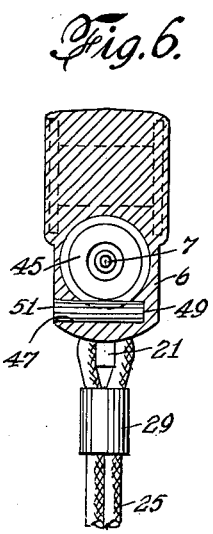
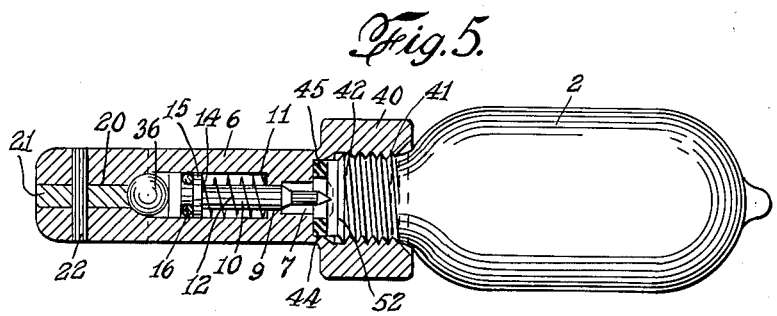
INVENTOR.
ALBERT MANHARTSBERGER
BY Edward T. Connors
ATTORNEY United States Patent Office 2,736,462
Patented Feb. 28, 1956

2,736,462

INFLATING DEVICE

Albert Manhartsberger, Orange, N. J., assignor, by mesne assignments, to Worcester Pressed Steel Company, Worcester, Mass., a company of Massachusetts Application July 18, 1952, Serial No. 299,626

3 Claims. (Cl. 222—5)

This invention relates generally to inflating devices for life preservers or the like of the type in which the inflating device employs a cartridge of compressed gas as the inflating medium.

In devices of this type a small cartridge of compressed gas is held in proximity to the piercing tip of a puncturing member which is actuated by an operating lever to urge the piercing tip through the end of the gas cartridge to release the contents thereof to the life preserver or other device.

Early in the art devices of this type were generally provided in which the gas cartridge was retained in a shell threadedly engaged with the housing to hold the cartridge in position in proximity to the piercing tip. As the art progressed, it was noted that the use of the shell precluded a visual inspection as to the presence of the cartridge. There was also a possibility of moisture entering the shell and causing the corrosion of the steel wall of the cartridge. Later devices have been provided in which the cartridge was provided with a threaded neck for engagement directly with the housing. Such devices have not been entirely satisfactory in that it has been found that the cartridge becomes loosened by vibration, etc., and permits leakage of the gas when the cartridge is punctured or the cartridge becomes positioned so far away from the piercing tip that it is not punctured. In other cases the cartridges have become entirely unscrewed and have been lost, thus, making the device unsuitable for use in an emergency.

The present inflating device aims to overcome the difficulties of the prior devices by providing a construction in which the cartridge remains in operating position even under conditions of vibration or the like.

Another object of the invention is to provide an inflating device which is simple and economical in manufacture, efficient in operation, and durable in use.

In accordance with the invention this is accomplished by providing an inflating device in which the gas cartridge is in threaded engagement therewith and in which resilient means are provided to secure the cartridge in position.

The construction in accordance with the invention is advantageous in that the cartridge is merely inserted in the inflator housing and tightened in position, the resilient means automatically securing in the cartridge.

Other objects and advantages of the invention will be apparent from the following description and from the accompanying drawings which show, by way of example, an embodiment of the invention.

In the drawings:

Figure 1 is a side view of an inflating device in accordance with the invention with a cartridge in position.

Figure 2 is a bottom view of the device shown in Figure 1.

Figure 3 is an end view of the device shown in Figure 1.

Figure 4 is a view corresponding to Figure 1 with the housing shown in vertical section.

Figure 5 is a view corresponding to Figure 2 with the housing shown in horizontal section.

Figure 6 is a view corresponding to Figure 3 showing a transverse section taken along the line 6—6 of Figure 4.

Referring to the drawings there is shown an inflating device 1 in accordance with the invention having in position therein a conventional gas cartridge 2. The inflating device 1 has a combined outlet and mounting opening 4 adapted to slip over the conventional life preserver inlet fitting in which one end of a short inlet pipe is secured to a patch in the wall of the life preserver, the other end of the pipe being threaded for engagement by a retaining nut. The inlet pipe has a flattened side wall adapted to be engaged by flattened surface 5 of the mounting opening 4 of the inflating device. Inasmuch as the inlet pipe of the life preserver is conventional, it has not been illustrated.

The inflating device housing 6 may be die cast or formed in other suitable manner and has a passage extending therethrough, end 7 forming the inlet portion of the housing, a cross passage 8 connecting with the outlet 4. A reduced wall portion 9 of the passage provides a bearing surface for a puncturing member 10 and also provides an abutment for one end 11 of a spring 12 having its other end 14 abutting against an enlarged end 15 of the puncturing member 10. A leak-proof structure is provided by a gasket 16 inserted in a recess about the enlarged portion 15 of the puncturing member. The outer end of the passage through the housing is slotted as indicated at 20 to provide an operating space for a flat operating lever 21 pivotally mounted in the housing by a pin 22 extending through aligned openings in the housing. The operating lever 21 is apertured as indicated at 24 to receive an operating cord 25 fitted with a pull knob 26, the operating cord held together by clamping members 27 and 29. Aperture 30 in housing 6 and aperture 31 in the operating lever 21 are placed in juxtaposition to replace a conventional sealing wire not shown. The other end 34 of the operating lever 21 is made with a cam surface 35 to engage a ball bearing member 36 interposed between the cam surface and the enlarged end 15 of the puncturing member 10.

An extension 40 is made at one end of the housing about the inlet 7 and is formed with a passage therethrough having a threaded surface 41 to engage a corresponding threaded surface on neck 42 of the gas cartridge 2. At the inner end of the housing is a recess 44 to receive a flat apertured gasket member 45, preferably made of nylon, teflon, Kel-F, or a similar resilient material with excellent memory characteristics. The extension 40 is widened laterally as may be seen in Figure 2 to form a boss 46 having a recess 47 extending therethrough, one end of the boss being closed as indicated at 49 while its other end 50 is open. The recess 47 opens to the passage in the extension 40 through the screw threads as may be seen in Figures 4 and 6.

A pin 51 made of the same material as gasket 45, that is, of nylon, teflon, or Kel-F or other suitable material with excellent memory characteristics is inserted in the recess 47 and secured in position by peening the housing slightly at the open end 50. It will be seen in Figure 4 that the pin 51 extends so as to interrupt the threaded inner surface of the extension 40. In inserting the cartridge 2, the pin 51 is crowded against the threaded surface of the cartridge neck 42 while end 52 of the cartridge neck 2 abuts against the gasket member 45. There is thus the composite action tending to hold the cartridge in position of the resilient engagement by the gasket 45 with the end of the cartridge neck together with the resilient engagement of the pin 51 with the threaded surface of the cartridge neck 42. It has been found that the cartridge 2 may be repeatedly inserted in position and removed from the housing 6 without deleteriously affecting the pin 51 or the gasket 45, and yet a firm engagement is provided between the parts to provide resistance against loosening by vibration or the like.

While the invention has been described and illustrated with reference to a specific embodiment thereof, it will be understood that other embodiments may be resorted to without departing from the invention, for example, while the resilient pin 51 has been illustrated as being in the recess 47 extending transversely of the extension 40, it is obvious that an alternative construction might be provided in which the pin extends in a recess parallel to the axis of the extension so as to engage along the entire threaded surface of the neck 42 of the cartridge 2. Therefore, the form of the invention as set out above should be considered as illustrative and not as limiting the scope of the following claims.

I claim:

1. A compressed gas cartridge inflating device comprising a housing having a fluid passage therethrough with inlet and outlet ends, the surface of the inlet end of the housing passage threaded to receive a conventional gas cartridge with an externally threaded neck, a portion of the housing passage of reduced diameter forming a shoulder, an apertured resilient gasket member abutting against the outward side of the shoulder so as to be compressed thereagainst by the end of the neck of the cartridge, means providing a transversely extending recess in the housing and opening through a portion of the threaded inlet surface, and resilient material in the recess and extending outwardly through a portion of the threaded surface so as to be compressed by the threaded neck of the cartridge, whereby the cartridge is held in position by the combined resilient action of the gasket and the resilient material.

2. A compressed gas cartridge inflating device comprising a housing having a fluid passage therethrough with inlet and outlet ends, the surface of the inlet end of the housing passage threaded to receive a conventional gas cartridge with an externally threaded neck, a portion of the housing passage of reduced diameter forming a shoulder, an apertured resilient gasket member abutting against the outward side of the shoulder so as to be compressed thereagainst by the end of the neck of the cartridge, means providing a transversely extending recess in the housing and opening through a portion of the threaded inlet surface, and a nylon pin in the recess and extending outwardly through a portion of the threaded surface so as to be compressed by the threaded neck of the cartridge, whereby the cartridge is held in position by the combined resilient action of the gasket and nylon pin.

3. A compressed gas cartridge inflating device comprising a housing having a fluid passage therethrough with inlet and outlet ends, the surface of the inlet end of the housing passage threaded to receive a conventional gas cartridge with an externally threaded neck, a portion of the housing passage of reduced diameter forming a shoulder, an apertured nylon gasket member abutting against the outward side of the shoulder so as to be compressed thereagainst by the end of the neck of the cartridge, means providing a transversely extending recess in the housing and opening through a portion of the threaded inlet surface, and a nylon pin in the recess and extending outwardly through a portion of the threaded surface so as to be compressed by the threaded neck of the cartridge, whereby the cartridge is held in position by the combined resilient action of the nylon gasket and nylon pin.

References Cited in the file of this patent

UNITED STATES PATENTS

| | | |
|---|---|---|
| 805,474 | Lavertine et al. | Nov. 28, 1905 |
| 2,120,248 | Hinchman | June 14, 1938 |
| 2,149,929 | Plastoras | Mar. 7, 1939 |
| 2,271,851 | Allen | Feb. 3, 1942 |
| 2,409,638 | Lyon | Oct. 22, 1946 |
| 2,445,125 | Reyburn et al. | July 13, 1948 |
| 2,462,603 | Boats | Feb. 22, 1949 |
| 2,547,052 | Sollmann | Apr. 3, 1951 |
| 2,596,415 | Kochner | May 13, 1952 |
| 2,675,941 | Nurkiewicz | Apr. 20, 1954 |

FOREIGN PATENTS

| | | |
|---|---|---|
| 408,629 | Great Britain | Apr. 11, 1934 |
| 495,195 | Great Britain | Nov. 8, 1938 |